United States Patent
Don et al.

(10) Patent No.: US 10,581,829 B1
(45) Date of Patent: Mar. 3, 2020

(54) CERTIFICATE-BASED CALL IDENTIFICATION AND ROUTING

(71) Applicant: Cisco Technology, Inc., San Jose, CA (US)

(72) Inventors: Suneth Mercian Wilathgamuwage Don, Oslo (NO); John Joseph Costello, Co. Galway (IE); Oliver W. Fagan, Galway (IE); Sinead Kelly, Co. Galway (IE); Christopher Edwin Pearce, Dallas, TX (US)

(73) Assignee: Cisco Technology, Inc., San Jose, CA (US)

(*) Notice: Subject to any disclaimer, the term of this patent is extended or adjusted under 35 U.S.C. 154(b) by 205 days.

(21) Appl. No.: 15/609,658

(22) Filed: May 31, 2017

(51) Int. Cl.
*H04L 29/06* (2006.01)
*H04L 12/721* (2013.01)

(52) U.S. Cl.
CPC .......... *H04L 63/0823* (2013.01); *H04L 45/34* (2013.01); *H04L 63/166* (2013.01); *H04L 65/1006* (2013.01); *H04L 65/1069* (2013.01)

(58) Field of Classification Search
CPC ... H04L 63/0823; H04L 63/166; H04L 45/34; H04L 65/1006; H04L 65/1069
See application file for complete search history.

(56) References Cited

U.S. PATENT DOCUMENTS

| | | | | |
|---|---|---|---|---|
| 8,000,463 | B2* | 8/2011 | Fukui | H04M 3/38 370/352 |
| 8,024,470 | B2* | 9/2011 | Olson | H04L 29/06027 709/227 |
| 8,290,130 | B2 | 10/2012 | Cheon et al. | |
| 8,578,167 | B2 | 11/2013 | Miyamoto et al. | |
| 8,745,400 | B2* | 6/2014 | Elwell | H04L 63/123 713/176 |
| 8,752,161 | B1* | 6/2014 | Thai | H04L 65/105 370/389 |
| 9,094,376 | B2* | 7/2015 | Krishnaswamy | H04L 63/08 |
| 9,485,099 | B2 | 11/2016 | Fu et al. | |
| 2010/0082977 | A1* | 4/2010 | Boyle | H04L 63/0815 713/158 |
| 2015/0131651 | A1* | 5/2015 | Tarricone | H04L 45/3065 370/352 |
| 2016/0255050 | A1 | 9/2016 | Grayson et al. | |
| 2016/0330164 | A1* | 11/2016 | Bellan | H04L 51/36 |

FOREIGN PATENT DOCUMENTS

CN 103595713 A 2/2014

* cited by examiner

*Primary Examiner* — Saleh Najjar
*Assistant Examiner* — Louis C Teng
(74) *Attorney, Agent, or Firm* — Edell, Shapiro & Finnan, LLC

(57) ABSTRACT

A Session Initiation Protocol enabled network connected device receives a client certificate from a client device. The SIP enabled network connected device validates the client certificate from information received from a certificate authority. The SIP enabled network connected device determines an identifier of the client device from the client certificate. The SIP enabled network connected stores the identifier of the client device. The SIP enabled network connected device receives a SIP message from the client device. The SIP enabled network connected device inserts the identifier of the client device into the SIP message. The SIP enabled network connected device transmits the SIP message to a destination SIP enabled device after inserting the identifier of the client device into the SIP message.

20 Claims, 6 Drawing Sheets

CERTIFICATE-BASED CALL IDENTIFICATION AND ROUTING

TECHNICAL FIELD

The present disclosure relates to communication sessions implemented through packet-based networks, such as Voice-over-Internet Protocol communication sessions.

BACKGROUND

Voice-over-Internet Protocol (VoIP) is a technology for the delivery of voice communications and multimedia sessions over Internet Protocol (IP) networks, such as the Internet. Cloud communications are Internet-based voice and data communications where telecommunications applications, switching and storage are hosted by a third-party outside of the organization using them, and they are accessed over the public Internet.

Both of these technologies may implement their respective communications using the Session Initiation Protocol (SIP). The Session Initiation Protocol is a communications protocol for signaling for the purpose of controlling multimedia communication sessions. Generally, the Session Initiation Protocol operates above the Transport Layer of the Open Systems Interconnection Model, and therefore, does not communicate information maintained at, for example, the Transport layer.

Certificate authentication is a system utilizing a public key certificate that is used to authenticate devices and organizations by proving their ownership of a public key derived from a mutually trusted source. Generally, certificate authentication is implemented at the Transport Layer of the Open Systems Interconnection Model through, for example, the Transport Layer Security (TLS) protocol.

DESCRIPTION OF EXAMPLE EMBODIMENTS

Overview

A Session Initiation Protocol (SIP) enabled network connected device receives a client certificate from a client device. The SIP enabled network connected device validates the client certificate based on information received from a certificate authority. The SIP enabled network connected device determines an identifier of the client device from the client certificate. The SIP enabled network connected device stores the identifier of the client device. The SIP enabled network connected device receives a SIP message from the client device. The SIP enabled network connected device inserts the identifier of the client device into the SIP message. The SIP enabled network connected device transmits the SIP message to a destination SIP enabled device after inserting the identifier of the client device into the SIP message.

Example Embodiments

Figure 1:
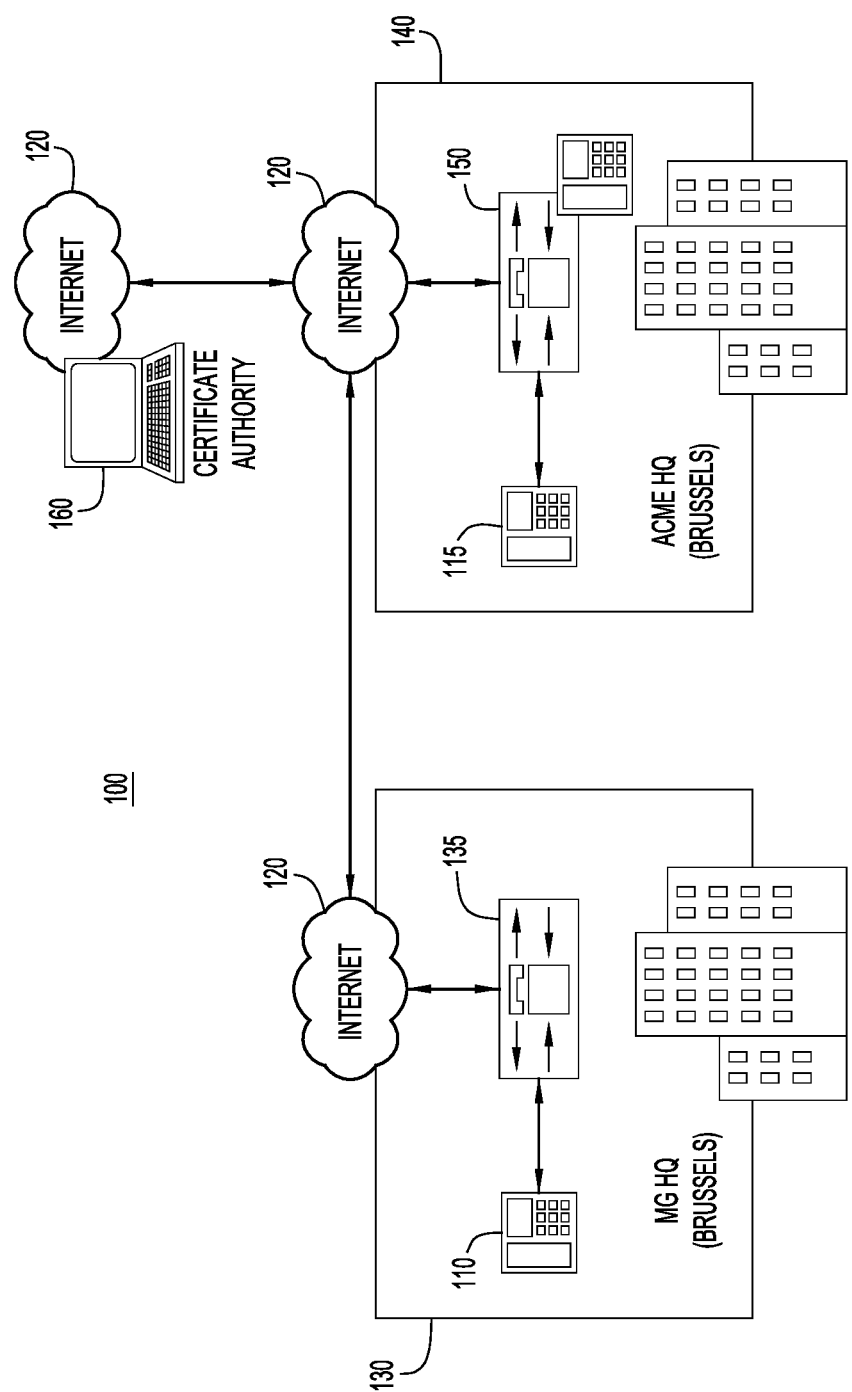
FIG. 1 is an illustration of a first example network environment configured to implement certificate-based call identification and routing, according to an example embodiment.

With reference now made to FIG. 1, depicted therein is a network environment 100 that is configured to provide certificate-based call identification and routing. According to the example embodiment of FIG. 1, the certificate-based call identification and routing is implemented through the inclusion of certificate-based identification in Session Initiation Protocol (SIP) messages. In other words, in specific example embodiments, SIP messages used to establish a communication session incorporate Open System Interconnection (OSI) model Transport Layer authentication. Devices utilizing these SIP messages to establish communication sessions may otherwise lack visibility into Transport Layer information. With this visibility to Transport Layer data, the devices utilizing the SIP messages are enabled to provide new functionality.

As will be described in more detail below, VoIP endpoint device 110 and VoIP endpoint device 115 establish a Voice over Internet Protocol (VoIP) call though the Internet 120. While the following discussion utilizes the terms "Voice over Internet Protocol" and "VoIP," it should be understood that calls may also include additional media and functionality beyond just voice data. For example, as used herein, the VoIP calls may also include video data, on-line collaborative session data (e.g., video conference and on-line presentation data), file sharing data, instant messaging data, and other types of media sessions that utilize, for example, the SIP protocol and perhaps other media communication protocols.

VoIP endpoint device 110 initiates a VoIP call for communication with VoIP endpoint device 115. This call may be considered a "business-to-business" call as it is a call between two separate entities, meaning two separate entities that do not share a VoIP service. For example, business entity 130 of which VoIP endpoint device 110 is a part may have its own VoIP system 135 or service that is separate from that of business entity 140 of which VoIP endpoint device 115 is a part. Because the call initiates from business entity 130 which operates a VoIP system 135 that is separate from that of business entity 140, VoIP endpoint device 110 may not be authenticated to the VoIP systems and devices for business entity 140. The process described below utilizes certificate-based authentication in order to authenticate VoIP endpoint device 110 to the VoIP system for business entity 140. This authentication enables numerous features for the call that might otherwise be difficult, impossible, or risky to implement from a security perspective. For example, VoIP systems permit features such as file sharing over the communication channels established for the call. By authenticating VoIP endpoint device 110 through certificate-based identification means, features such as file sharing may be implemented without or with reduced security concerns. Identifying and authenticating VoIP endpoint device 110 may also allow the VoIP call to be appropriately routed if routing decisions are based on the identity of VoIP endpoint device 110.

As part of the process for initiating the call, VoIP endpoint device 110 sends a message via VoIP system 135 that is received by VoIP system 150. VoIP system 150 may include and/or be embodied as, for example, a SIP enabled network connected device such as a call manager device, a public branch server (PBX), a session border controller (SBC), a routing engine device or other network devices, such as a network edge device for business entity 140 that is configured to receive, process and/or forward SIP messages for a call between two or more VoIP endpoint devices. The message sent to VoIP system 150 may be part of a Transport Layer Security (TLS) handshake that will establish a communication session over which the VoIP call will be established. A certificate, such as a public key certificate, may be included in the message sent to VoIP system 150. Upon receipt of the certificate, the SIP enabled device within VoIP system 150 authenticates the certificate based upon information received from certificate authority 160. Network communication between the various entities shown in FIG. 1 is by way of the Internet shown at reference numeral 120.

Certificate authorities like certificate authority 160 are services that issue digital certificates, like the certificate received by VoIP system 150 from VoIP system 135. The certificate certifies the ownership of a public key by the named subject of the certificate (e.g., VoIP endpoint device 110 or business entity 130). For example, the certificate may include a signature provided by certificate authority 160 that has been encrypted using a private key stored at certificate authority 160. By evaluating this signature, a SIP enabled device within VoIP system 150 verifies that VoIP endpoint device 110 has been previously identified by certificate authority 160. SIP enabled network connected devices within VoIP system 150 may then trust identifying information contained within the received certificate as accurately identifying business entity 130 as the entity associated with the call placed by VoIP endpoint device 110.

According to the specific example embodiment of FIG. 1, a SIP enabled network connected device associated with VoIP system 150 evaluates the certificate received from VoIP system 135 as part of the TLS handshake procedure. Upon authenticating VoIP system 135 via its certificate, the SIP enabled network connected device associated within VoIP system 150 stores information derived from the certificate. This stored information may be, for example, information identifying an entity contained in the Subject Alternative Name (SAN) list contained in the certificate. The SIP enabled network connected device associated with VoIP system 150 will then include this stored information in SIP messages used to establish the call between VoIP endpoint device 110 and VoIP endpoint device 115.

Upon completion of the TLS handshake, VoIP system 135 sends a SIP message via the established TLS connection, such as a SIP invite message to establish the terms for the media session that will transmit the audio and other data associated with the call between VoIP endpoint device 110 and VoIP endpoint device 115. The SIP enabled device associated with VoIP System 150 intercepts the SIP message and inserts the stored information into the SIP message. For example, the SIP enabled network connected device associated with VoIP System 150 may insert the stored information as a source identifier in a SIP header of the SIP message. With the stored information now contained in the SIP header, VoIP endpoint device 115, or a device within the VoIP system 150 of business entity 140 may take into account the authenticated identity of VoIP system 135 or VoIP endpoint device 110. In other words, VoIP system 150 (including VoIP endpoint device 115) will receive TLS authentication information through the SIP message. This TLS information, which VOIP system 150 would otherwise lack, provides VoIP system 150 with the ability to make numerous decision for the VoIP communication session. For example, VoIP system 150 and/or VoIP endpoint device 115 may provide additional media services to the call if the identity of VoIP endpoint device 110 is known through the previously described certificate authentication. In fact, there are a multitude of possible downstream decisions that may be made when the identity of the calling device is known through certificate authentication. These decisions include but are not be limited to:

Licensing decisions, wherein for example, certain organizations may be entitled to free connections while other organizations may have to consume/provide a paid-for license confirmation for each connection.

Decisions regarding feature enablement based on the organization associated with the device making the call. For example, licensing, tier status and/or a credit level may be necessary before some organizations are entitled to video calls, mid-call features, long distance calls or international calls. Other features, such as file sharing may be limited to organizations with a predetermined trust rating.

Decisions regarding bandwidth entitlements may also be made based on the identity of the organization associated with the calling device. For example, traffic may be segmented for different tiers of customers—some customers may be entitled to dynamic bandwidth utilization while others receive best effort or "pay as you go" bandwidth utilization. These types of decisions may be particularly useful for service provider organizations, such as those operating call centers that service customers that have paid for and/or receive different services.

Additionally, the process described above leverages existing and widely used certificate validation mechanisms. Accordingly, example embodiments of the process described above may require few or no changes on the VoIP system side, and thus makes example embodiments of the process described above compatible with many existing VoIP systems that establish connections over TLS and which have valid client certificates. Furthermore, the injection of the identification information into the SIP messages allows example embodiments of the process described above to propagate the identification information from the Transport Layer up to the Application Layer, allowing further applications to make routing or enablement decisions based upon the determined identity.

Figure 2:
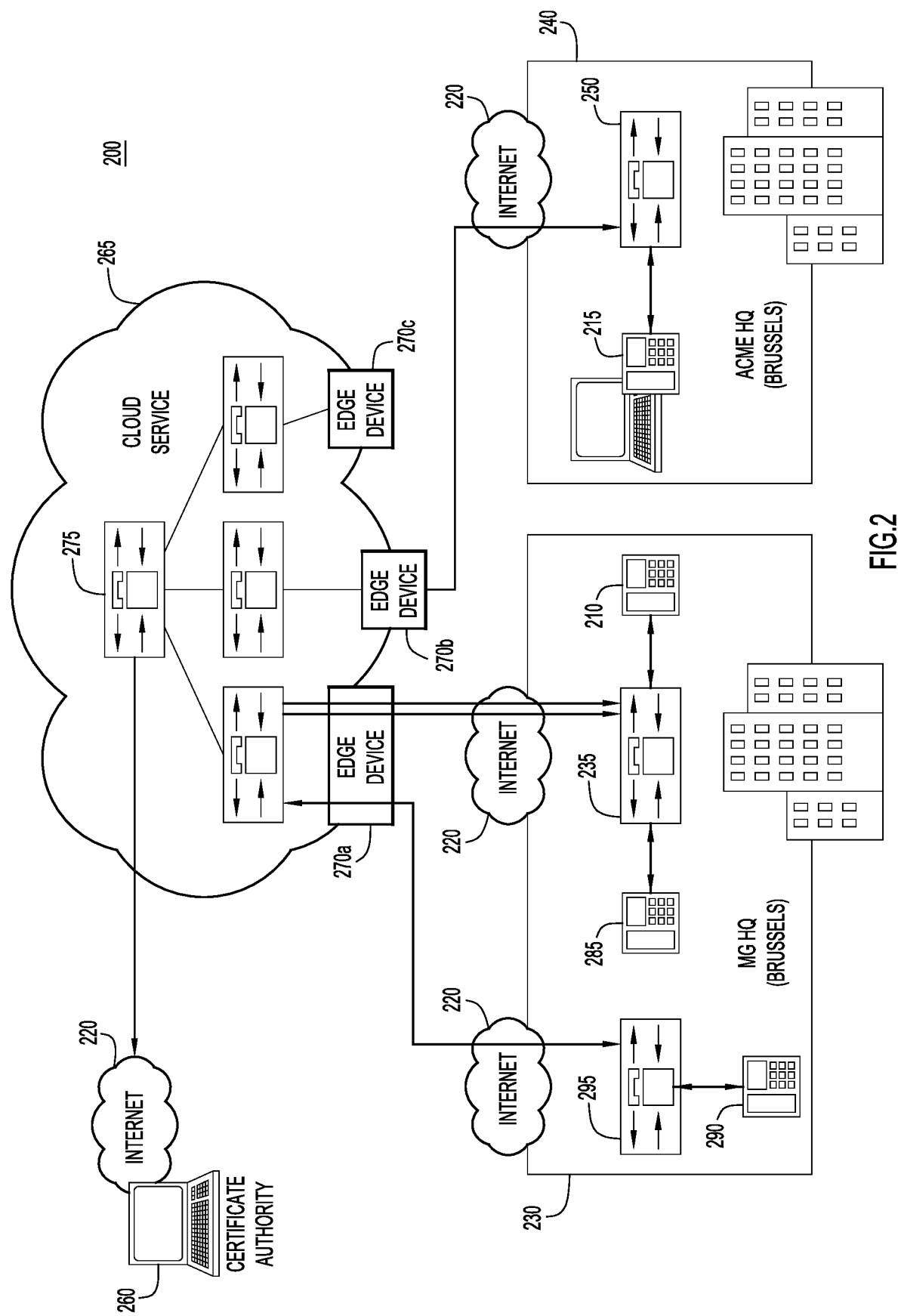
FIG. 2 is an illustration of a second example network environment configured to implement certificate-based call identification and routing, according to an example embodiment.

With reference now made to FIG. 2, depicted therein is a second example embodiment of a network environment 200 configured to implement the techniques disclosed herein. Like FIG. 1, FIG. 2 illustrates two business organizations 230 and 240. Unlike FIG. 1, business organizations 230 and 240 of FIG. 2 utilize cloud service 265 for VoIP services as opposed to the individual VoIP services of FIG. 1. Cloud service 265 includes an apparatus or processor 275 referred to as a routing engine that performs routing functions as described below. The routing engine functions of apparatus or function 275 may be performed by software running on a server or other SIP enabled network connected device having network connectivity within the cloud service 265. Within organization 230, VoIP endpoint devices 210 and 285 access VoIP services through cloud service 265, as does VoIP endpoint device 215 of organization 240. Organization 230 also has VoIP endpoint device 290 which receives VoIP services through legacy VoIP system 295. Business organizations 230 and 240 may still utilize network devices 235 and 250, respectively to access cloud service 265. As used herein, network devices 235 and 250 may be considered client network devices because they receive VoIP services from cloud service 265 and/or because they provide a client certificate to cloud service 265 as part of a TLS handshake, as will be described below. Network devices 235 and 250 may be embodied as, for example, SBCs or other edge network devices. As will also be described below, certificate-based call identification and routing as described herein provides benefits to cloud-based VoIP service providers, as well as combinations of legacy and cloud-based VoIP service providers. Cloud service 265 has multiple cloud service edge devices examples of which are shown at reference numerals 270*a*, 270*b* and 270*c*. Communication between the various entities is by way of the Internet shown at reference numeral 220.

For example, applying certificate-based identification and call routing to a call placed from VoIP endpoint device 210 to VoIP endpoint device 215 may proceed as follows. Initially, network device 235 and cloud service edge device 270*a* perform a TLS handshake procedure. During this procedure, network device 235 provides its certificate to cloud service edge device 270*a*. Cloud service edge device 270*a* authenticates the certificate based upon the signature in the certificate that has been signed by the private key of certificate authority 260. Cloud service edge device 270*a* stores identifying information from the certificate, such as an entry from a SAN list contained in the certificate, and this information may be injected into SIP messages sent via the TLS session established by the handshaking procedure. Because cloud service edge device 270*a* has identified the organization associated with network device 235 and VoIP endpoint device 210 (i.e., organization 230), cloud service edge device 270*a* may include the identifying information in SIP messages received over the TLS session and forward the SIP messages onto, for example, routing engine 275. Without cloud service edge device 270*a* inserting the identifying information into the SIP messages, routing engine 275 may be ignorant of this Transport Layer level information. Due to the inclusion of the identifying information in the SIP messages, routing engine 275 may consider this Transport Layer level information and perform VoIP services that are specific to organization 230. For example, routing engine 275 may make organization-specific routing decisions. Routing engine 275 or any other downstream VoIP enable device, including network device 250 and VoIP endpoint device 215, may make other types of call decisions based upon the identification information included in the SIP headers. These call decisions may include licensing decisions, call feature enablement decisions, and/or bandwidth entitlement decisions, among others.

The certificate-based identification techniques described herein may also be applied to calls between two devices within the same organization, such as a call between VoIP endpoint device 210 and VoIP endpoint device 285, both of which are associated with organization 230 and both of which are provided VoIP services via cloud service 265. For example, VoIP endpoint device 210 places a call intended for VoIP endpoint device 285. As VoIP endpoint device 285 is associated with organization 230, the call may be dialed from VoIP endpoint device 210 with an internal or organization-specific destination number or identifier. Two or more VoIP endpoint devices that utilize cloud service 265 may share the same organizational identifier if they belong to different business organizations. For example, VoIP endpoint device 215 may have an identifier of "0001." VoIP endpoint device 285 may also have an identifier of "0001." Accordingly, if routing engine 275 receives a SIP message with a destination field as follows, there may be an ambiguity as to whether or not the call should be routed to VoIP endpoint device 285 or VoIP endpoint device 215: 0001@cloudservice.com.

On the other hand, if the SIP message also includes information identifying the organization from which the SIP message was received, this ambiguity may be removed. For example, if routing engine 275 receives a SIP message with an ambiguous local destination (e.g., "0001@cloudservice.com"), routing engine 275 may remove this ambiguity by also considering the certificate identification information that has been included in the SIP message by cloud service edge device 270*a*. The certificate identification information may indicate that the SIP message originated from organization 230, and therefore, a local identifier should be routed to a VoIP endpoint device also located in organization 230. In other words, the certificate authentication information included in the SIP message allows routing engine 275 to select between VoIP endpoint device 285 and VoIP endpoint device 215 (both of which share a local designation of "0001@cloudservice.com") when determining where to route the SIP message.

The certificate-based call identification and routing described herein also provides security benefits, preventing one cloud tenant, such as organization 240 from spoofing other cloud tenants, such as organization 230. Similarly, the certificate-based call identification and routing described herein may prevent non-cloud tenants from attempting to spoof cloud tenants. For example, if traffic is received at any one of cloud service edge devices 270*a*-*c*, even if the traffic is otherwise configured to look like it is coming from a particular cloud tenant, the certificate-based authentication will identify any discrepancy between the organization that the traffic is attempting to spoof and the actual source of the traffic. Specifically, when the certificate is provided to any one of the cloud service edge devices 270*a*-*c*, the certificate may fail to authenticate, or the organizations included in the SAN list of the certificate will conflict with the organization otherwise indicated by the traffic. According to other example embodiments, if one cloud tenant initially establishes the TLS connection by using its own certificate, and then later modifies SIP messages to appear as if they originated from a different organization, the identifying information injected into the SIP messages via the cloud service edge devices 270*a*-*c* may be compared with the other identifying information, such as a source identifier, in the SIP messages. Any discrepancy between these identifiers may be flagged as a security violation.

Finally, the certificate-based call identification and routing described herein may be useful in example embodiments in which a new cloud-based service is being brought online with an existing VoIP system. Such a parallel implementation is illustrated in organization 230 of FIG. 2. As illustrated, VoIP endpoint devices 210 and 285 are provided with VoIP services by cloud service 265 while VoIP endpoint device 290 is provided with VoIP services by VoIP system 295. Such a parallel implementation is often found when a new cloud-based service is being brought online. Initially, either a subset of users will be moved to the cloud-based service as a trial and/or the cloud-based service is gradually brought online as users are gradually migrated to the new cloud-based service. In either situation, it may be beneficial to bridge or "trunk" the two systems together. This "trunking" allows all three VoIP endpoint devices 210, 285 and 290 to seamlessly appear as if they are all on the same communication system, even though VoIP endpoint devices 210 and 285 are serviced by cloud service 265 and VoIP endpoint device 290 is serviced by VoIP system 295.

For example, when an internal call is placed from VoIP endpoint device 290 destined for either of VoIP endpoint devices 210 or 285, the messages associated with establishing the call are received at cloud service edge device 270a as having come from an external, non-cloud-based source, i.e., VoIP system 295. Nevertheless, the destination information may indicate an internal identifier. Accordingly, the source of the traffic may need to be authenticated to ensure that the traffic is being received from a trusted source, and the source may need to be identified to remove any possible ambiguities associated with the destination information included in the traffic. In other words, traffic received from VoIP endpoint device 290 via VoIP system 295 needs to be authenticated to ensure that it is coming from organization 230. Additionally, if the destination information included in the traffic is received in the form of an internal identifier, the organization associated with the source of the traffic needs to be identified so that the traffic may be routed to the correct destination organization. The certificate-based authentication described herein may be used to provide both of these functions.

Specifically, when cloud service edge device 270a receives messages from VoIP endpoint device 290 via VoIP system 295, a TLS handshaking procedure will be performed. During this handshaking procedure, cloud service edge device 270a receives the client certificate of organization 230. This certificate is authenticated according to pre-established certificate authentication procedures. Cloud service edge device 270a stores information derived from the certificate, such as a SAN entry included in the certificate. Cloud service edge device 270a inserts this stored information into SIP messages subsequently received from VoIP endpoint device 290. Accordingly, when routing engine 275 receives the SIP messages sent from VoIP endpoint device 290, routing engine 275 knows (can determined) that the messages are associated with organization 230, routing engine 270 knows (can determine) that the SIP messages are coming from an authenticated source, and routing engine 275 may eliminate any ambiguities introduced by internal identifiers utilized by two or more tenants of cloud service 265.

Finally, in addition to the routing, security and trunking decisions described above, cloud service 265 may also make licensing, feature enablement and bandwidth utilization decisions based upon the certificate-based authentication information incorporated into the SIP messages. For example, based on the authentication information included in the SIP messages, cloud service 265 may determine which traffic is associated with organizations entitled to free connections and which traffic is associated with organizations that are required to provide a paid for license confirmation for each connection. Cloud service 265 may decide that licensing, tier status and/or a credits level may be necessary before some organizations are entitled to video calls, or mid-call features. Other features, such as file sharing may be limited to organizations with a predetermined trust rating, a rating that cloud service 265 may determine from the identifying information included in the SIP messages. Cloud service 265 may also segment traffic for different tiers of organizations based upon the identification information contained in the SIP messages. For example, some organizations may be entitled to dynamic bandwidth utilization while others may receive best effort or "pay as you go" bandwidth utilization.

Figure 3:
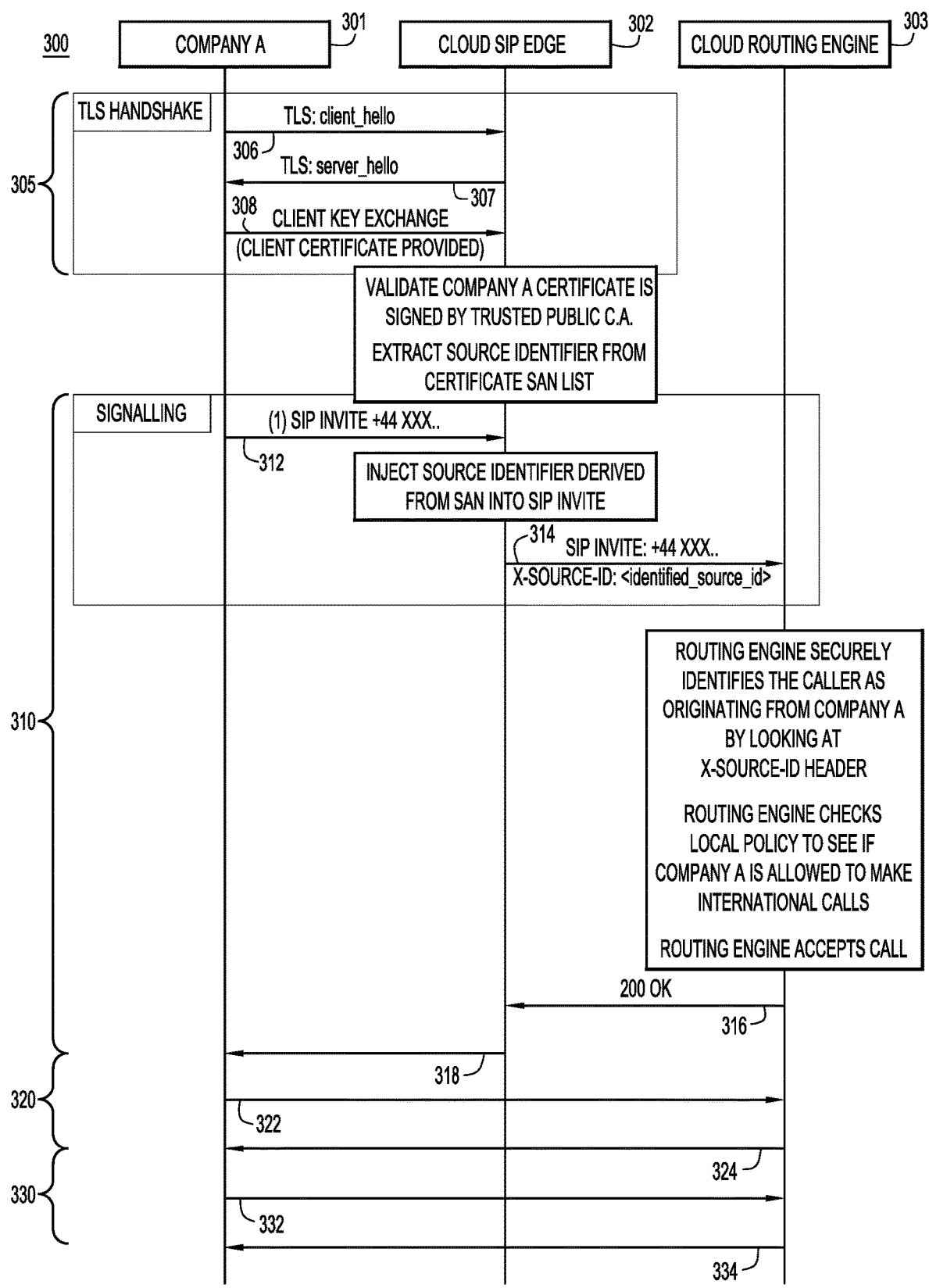
FIG. 3 is a sequence diagram illustrating a message exchange between Session Initiation Protocol enabled devices that implements certificate-based call identification and routing, according to an example embodiment.

With reference now made to FIG. 3, depicted therein is a sequence diagram illustrating an operational sequence 300 of the messages sent in an example embodiment of the certificate-based authentication and routing described herein. Specifically, the sequence diagram of FIG. 3 illustrates the messages sent between an organization's VoIP enabled client device 301, a cloud service edge device 302, and a cloud service routing engine 303 that are used to implement the certificated-based call identification and routing described herein. The operational sequence 300 includes a TLS handshake phase 305, a SIP signaling phase 310, a media exchange phase 320, and an ending of the call 330.

The organization's VoIP enabled client device 301 initiates the TLS handshake by sending message 306 to VoIP cloud service edge device 302. VoIP enabled client device 301 may be embodied as a VoIP endpoint device (e.g., endpoint devices 110 and 115 of FIG. 1), a VoIP System device (e.g., a device included in VoIP systems 135 and 150 of FIG. 1 and VoIP system 295 of FIG. 2) or an edge network device for an organization (e.g., network devices 235 and 250 of FIG. 2). As used herein, VoIP enabled client device 301 is referred to as a "client device" because it provides a client certificates as described below. Message 306 is a TLS client_hello message. Cloud service edge device 302 responds with a TLS server_hello message 307 that includes a client certificate request. VoIP enabled client device 301 responds by sending message 308 that initiates a client key exchange. Message 308 includes the client certificate that will be evaluated by cloud service edge device 302. Specifically, cloud service edge device 302 validates the client certificate based upon the signature signed by the certificate authority that is contained in the client certificate. Once the certificate is authenticated, the cloud service edge device 302 compares the values in the certificate SAN list with a list of trusted organizations. If the SAN information matches a value in the trusted organizations list, cloud service edge device 302 tags the TLS connection as being trusted. Cloud service edge device 302 may also store information from the SAN edge list to be inserted into SIP messages that will be subsequently sent from the VoIP enabled client device 301. According to other example embodiments, cloud service edge device 302 may tag a particular entry in its list of trusted organizations as the information to be injected into the subsequently sent SIP messages.

During the signaling phase 310, the VoIP enabled client device 301 sends a SIP INVITE message 312. Cloud service edge device 302 receives SIP INVITE message 312, injects the identification information stored or tagged at cloud service edge device 302 into the SIP INVITE message, and forwards the SIP INVITE message to cloud service routing engine 303 as SIP INVITE message 314. According to the example embodiment of FIG. 3, cloud service edge device 302 injects the identifying information into SIP INVITE message 314 in the form of a non-standard or "X" header. Designers and implementers of application protocols have often distinguished between standardized and unstandardized parameters by prefixing the names of unstandardized parameters with the string "X-" or similar constructs. Such a non-standard header is utilized by cloud service edge device 302. Routing engine 303 identifies the caller that initiated SIP INVITE message 312 as coming from a trusted organization based upon the content of the "X" header. Routing engine 303 checks its local polices and determines if the organization identified in the "X" header is permitted to make the type of call requested in SIP INVITE message 312. For example, if SIP INVITE message 312 is requesting an international call, cloud service routing engine 303 checks to see if the organization identified in the "X" header is allowed to make international calls. If SIP INVITE message 312 is requesting a video call, routing engine 303 checks to see if the organization identified in the "X" header is permitted to make video calls. Assuming the requests made in SIP INVITE message 312 conform with the policies routing engine 303 implements for the organization indicated in the "X" header, routing engine 303 accepts the call. Not illustrated are the additional messages sent by routing engine 303 to complete the call through to the called VoIP endpoint device. Once the call is established, routing engine 303 sends SIP OK message 316 to cloud service edge device 302, and cloud service edge device 302 forwards the OK message to VoIP enabled client device 301 via message 318. If VoIP enabled client device 301 is not the calling VoIP endpoint device, other messages may be exchanged between VoIP enabled client device 301 and the calling VoIP endpoint device to establish the call.

Once the signaling is complete, the calling VoIP endpoint device and the called VoIP endpoint device transmit the media associated with the call through messages 322 and 324. According to the example embodiment of FIG. 4, messages 322 and 324 are Real-time Transport Protocol (RTP) messages. Finally, the call is ended through SIP release message 332, which is confirmed through SIP OK message 334.

Figure 4:
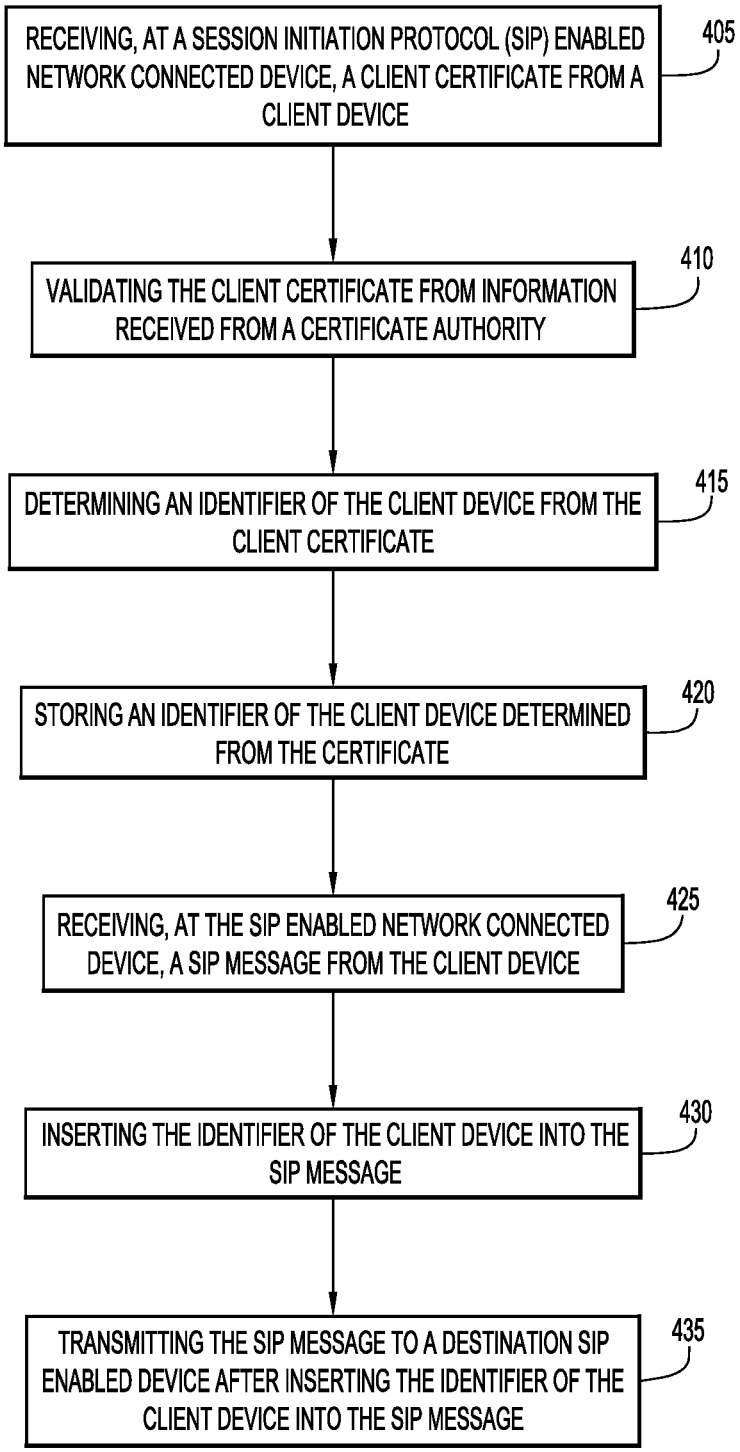
FIG. 4 is flowchart illustrating a first process for implementing certificate-based call identification and routing, according to an example embodiment.

With reference now made to FIG. 4, depicted therein is a flowchart illustrating a process 400 for performing certificate-based call identification and routing. Reference is also made to FIGS. 1-3 in connection with the description of FIG. 4. The process 400 is illustrated from the perspective of, for example, a cloud service edge device that receives a call request from an initiating SIP enabled device, an edge network device such as an SBC, or a PBX servicing the organization of the device being called by the call initiating device.

The process begins in operation 405 in which a SIP enabled network connected device receives a client certificate from a client device. As used herein, the client device is referred to as a "client device" because it is the device from which the client certificate is received. The client certificate may be received during a TLS handshake procedure between the client device and the SIP enabled network connected device. Device 110 of FIG. 1 or device 290 of FIG. 2 may be a client device that initiates a call from an organization that is provided VoIP services from an organization-specific VoIP system. According to other example embodiments, the client device may be an SIP enabled device (e.g., an SBC) within a VoIP system, such as VoIP systems 135 and 150 of FIG. 1. According to other example embodiments, the client device may be a VoIP device (e.g., a VoIP endpoint device, an SBC, an edge network device, among others) within an organization that is provided VoIP services from a cloud service, like cloud service 265 of FIG. 2. If a call is being placed to an endpoint device associated with an organization that is provided VoIP services from an organization-specific system, the SIP enabled network connected device may be embodied as a call manager device, an SBC, a PBX or a routing engine device within a VoIP system, such as VoIP systems 135 and 150 as described above in connection with FIG. 1. If the call is being placed to a device associated with an organization that is provided VoIP services from a cloud service like cloud service 265 of FIG. 2, the SIP enabled network connected device may be embodied as a cloud service edge device, such as cloud service edge devices 270*a-c* of FIG. 2.

In operation 410, the client certificate is validated through information received from a certificate authority. For example, a signature of the client certificate may be evaluated using a key derived from information received from the certificate authority. In operation 415, an identifier of the client device is determined from the client certificate, and in operation 420 the identifier of the client device is stored. For example, the identifier of the client device may be an entry from the SAN list of the client certificate. The storing of the identifier of the client device may be embodied as the storing of the determined entry of the SAN list. According to other examples, the SIP enabled network connected device may contain a list of previously trusted organizations. In such an example embodiment, the storing of the identifier of the client device may be the storing of an indication of which of the trusted organizations in the predetermined list was found in the SAN list of the client certificate.

In operation 425, the SIP enabled network connected device receives a SIP message from the client device. For example, the SIP message may be a SIP INVITE message that the client device sends to the SIP enabled network connected device over the TLS connection established during the handshaking procedure of operations 405. In operation 430, the identifier of the client device is inserted into the SIP message. For example, the SIP enabled network connected device may insert the identifier of the client device into the SIP message as an "X" header.

Finally, in operation 435, the SIP message is transmitted to a destination SIP enabled device after the identifier of the client device is inserted into the SIP header. For example, the SIP enabled network connected device may transmit to a routing engine the SIP message with the "X" header that includes the identifier of the client device. As a further example, a PBX may transmit the SIP message with the "X" header that includes the identifier of the client device to a SIP enabled endpoint device. Once the SIP message includes the identifier of the client device, other operations may take place, such as the routing decisions, the licensing decisions, the call feature enablement decisions, and/or the bandwidth entitlement decisions, among others, described above with reference to FIGS. 1-3.

Figure 5:
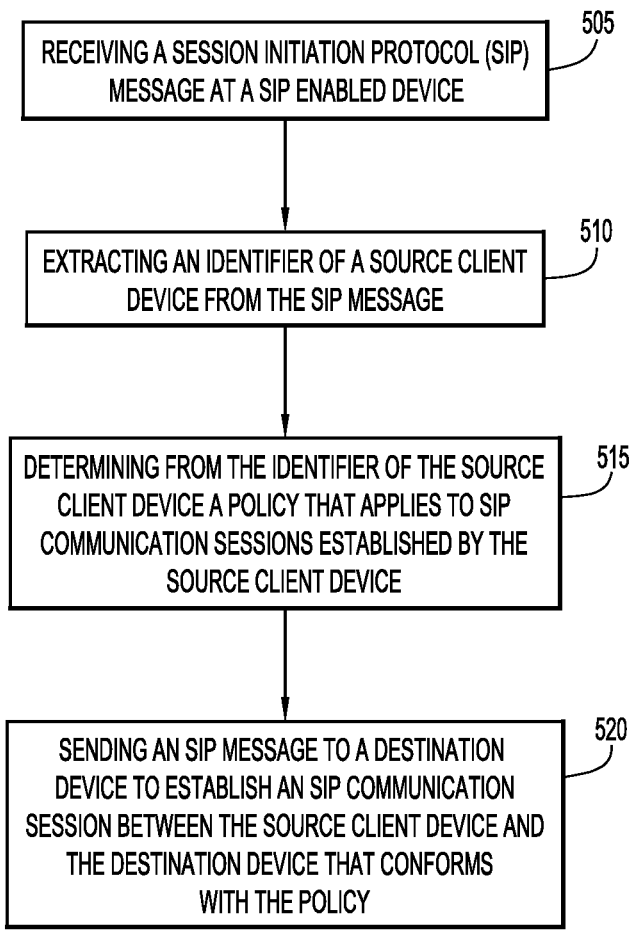
FIG. 5 is flowchart illustrating a second process for implementing certificate-based call identification and routing, according to an example embodiment.

With reference now made to FIG. 5, depicted therein is a flowchart illustrating a process 500 for implementing certificate-based call identification and routing from the perspective of a device such as a cloud service routing engine, an edge network device servicing the organization of the called endpoint device such as an SBC, or a PBX servicing the organization of the called VoIP endpoint device.

The process begins in operation 505 where a SIP message is received at a SIP enabled network connected device. As noted above, the SIP enabled network connected device may be embodied as a cloud service routing engine, a network device providing VoIP services to the organization of the called endpoint device such as an SBC, or a PBX servicing the organization of the called device. In operation 510, an identifier of a source client device is extracted from the SIP message. As used herein, the source client device is referred to as a "client device" because it is associated with an organization that was authenticated to the SIP enabled device via a client certificate. For example, the identifier of the source client device may be an identifier inserted into the SIP message according to operation 430 of FIG. 4. Accordingly, the identifier of the source client device may be an identifier derived from a SAN list of a client certificate of the source client device. In other words, the identifier of example embodiments may be an identifier derived from Transport Layer level information. Operation 510 may be embodied by the cloud service routing engine extracting this identifier from the SIP message it receives from the cloud service edge device.

In operation 515, a policy that applies to SIP connections formed by the source client device is determined. The policy may be one or more of the licensing policies, call feature enablement policies, routing policies, and/or bandwidth entitlement policies, among others, described above with regard to FIGS. 1-3. Accordingly, operation 515 may be involve the cloud service routing engine determining polices for a SIP connection based upon the identification information received in the SIP message. In other words, the cloud service routing engine determines polices to apply to SIP connections from Transport Layer information, information that the cloud service routing engine might have been ignorant of absent the techniques taught herein.

In operation 520, a SIP message is sent to a destination device to establish a SIP communication session between the source client device and the destination device that conforms with the policy. For example, operation 520 may establish a call between a source client device and a destination device that conforms with the licensing policies, call feature enablement policies, routing policies, and/or bandwidth entitlement policies, among others, described above with regard to FIGS. 1-3.

Figure 6:
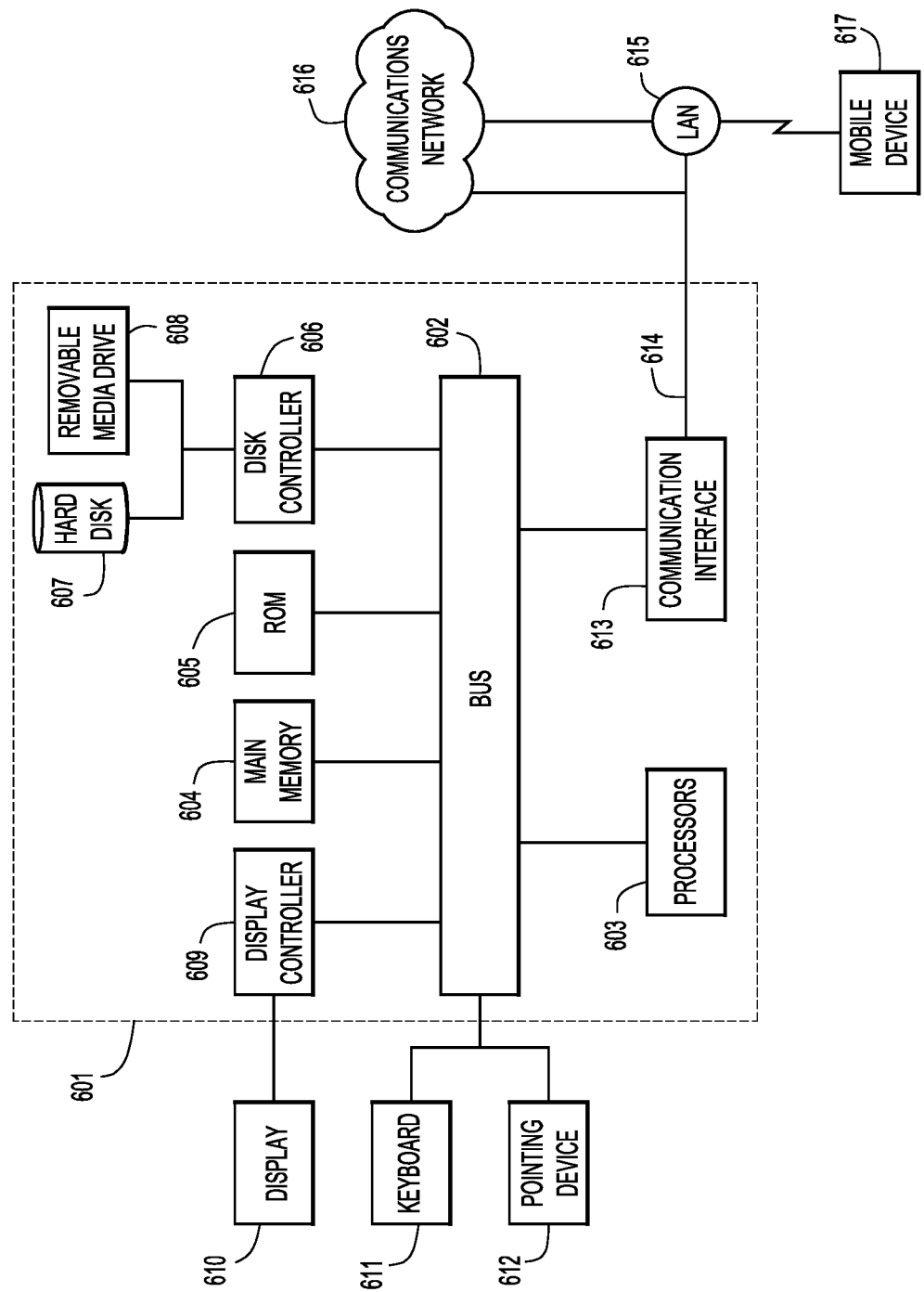
FIG. 6 is a block diagram illustration of a device configured to implement certificate-based call identification and routing, according to an example embodiment.

With reference now made to FIG. 6, illustrated therein is a computer system 601 upon which the embodiments presented may be implemented. The computer system 601 may be programmed to implement a computer based device, such as VoIP endpoint device (phone), a video conferencing endpoint or any device includes a video encoder or decoder for processing real time video images. The computer system 601 may also be programmed to function as a call manager device, a PBX, a routing engine device, and/or a cloud service edge device configured to operate according to the techniques described herein. Thus, the block diagram of FIG. 6 is a block diagram representative of a VoIP endpoint device ("client device"), a call manager device, a PBX and a routing engine (server running a routing engine function) described above in connection with FIGS. 1-5.

The computer system 601 includes a bus 602 or other communication mechanism for communicating information, and a processor 603 coupled with the bus 602 for processing the information. While the figure shows a single block 603 for a processor, it should be understood that the processors 603 represent a plurality of processing cores, each of which can perform separate processing. The computer system 601 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such as a cathode ray tube (CRT), Liquid Crystal Display (LCD) or other now known or hereinafter developed display technologies, for displaying information to a computer user. The computer system 601 includes input devices, such as a keyboard 611 and a pointing device 612, for interacting with a computer user and providing information to the processor 603. The pointing device 612, for example, may be a mouse, a trackball, or a pointing stick for communicating direction information and command selections to the processor 603 and for controlling cursor movement on the display 610. In addition, a printer may provide printed listings of data stored and/or generated by the computer system 601.

The computer system 601 performs a portion or all of the processing steps of the process in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 601, for driving a device or devices for implementing the process, and for enabling the computer system 601 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local area network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA) laptop computer, or cellular telephone.

In summary, described herein is a solution to source enterprise identification based on client certificates. By identifying the source enterprise based purely on the certificate, the requirement that the destination enterprise has either a pre-established trust with the source enterprise or has knowledge or control of the source enterprise is negated.

Through the techniques described herein, call identification and routing is achieved by leveraging widely used validation mechanisms, while providing this information in new ways to enable new functionality. According, the new functionality may be enabled in any enterprise that establishes a connection over TLS and has valid client certificates. The injection of the source identification information into the SIP messages allows for the information to be propagated from the Transport Layer up to the Application Layer, allowing any further applications to make routing or enablement decisions based on the determined identity.

In one form, a method is provided comprising: receiving, at a Session Initiation Protocol (SIP) enabled network connected device, a client certificate from a client device; validating the client certificate with information received from a certificate authority; determining an identifier of the client device from the client certificate; storing the identifier of the client device; receiving, at the SIP enabled network connected device, a SIP message from the client device; inserting the identifier of the client device into the SIP message; and transmitting the SIP message to a destination SIP enabled device after inserting the identifier of the client device into the SIP message.

In another form, a method is provided comprising: receiving a Session Initiation Protocol (SIP) message at a SIP enabled device; extracting an identifier of a source client device from the SIP message; determining from the identifier of the source client device a policy that applies to SIP communication sessions established by the source client device; and sending a SIP message to a destination device to establish a SIP communication session between the source client device and the destination client that that conforms with the policy.

These methods may also be embodied in non-transitory computer readable storage media that are encoded with instructions which, when executed by one or more processors, cause the one or more processors to perform the above-described methods.

In still another form, an apparatus is provided comprising: a network interface configured to communicate over a network; a memory, and one or more processors, wherein the one or more processors are configured to: receive, via the network interface, a client certificate from a client device; validate the client certificate with information received from a certificate authority; determine an identifier of the client device from the client certificate; store the identifier of the client device in the memory; receive, via the network interface, a Session Initiation Protocol (SIP) message from the client device; insert the identifier of the client device into the SIP message; and transmit, via the network interface, the SIP message to a destination SIP enabled device after inserting the identifier of the client device into the SIP message.

Similarly, an apparatus is provided comprising: a network interface configured to communicate over a network; a memory, and one or more processors, wherein the one or more processors are configured to: receive a Session Initiation Protocol (SIP) message at a SIP enabled device; extract an identifier of a source client device from the SIP message; determine from the identifier of the source client device a policy that applies to SIP communication sessions established by the source client device; and send a SIP message to a destination device to establish a SIP communication session between the source client device and the destination client that that conforms with the policy.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
receiving, at a Session Initiation Protocol (SIP) enabled network connected device, a client certificate from a client device, wherein the client certificate is used to authenticate a communication session between the client device and the SIP enabled network connected device;
validating the client certificate with information received from a certificate authority;
determining an identifier of the client device from the client certificate;
storing the identifier of the client device;
receiving, at the SIP enabled network connected device, a SIP message from the client device;
inserting the identifier of the client device into the SIP message; and
transmitting the SIP message to a destination SIP enabled device after inserting the identifier of the client device into the SIP message.

2. The method of claim 1, wherein transmitting the SIP message to the destination SIP enabled device comprises transmitting the SIP message to a cloud service routing engine.

3. The method of claim 1, wherein the SIP enabled network connected device is a cloud service edge device.

4. The method of claim 1, wherein storing the identifier of the client device comprises storing an identifier from a Subject Alternative Name (SAN) list of the client certificate.

5. The method of claim 1, wherein:
receiving the client certificate comprises receiving the client certificate as part of a Transport Layer Security (TLS) handshake to establish the communication session between the client device and the SIP enabled network connected device, wherein the communication session comprises a TLS session; and
receiving the SIP message comprises receiving the SIP message through the TLS session.

6. The method of claim 1, wherein receiving the SIP message comprises receiving a SIP INVITE message.

7. The method of claim 6, further comprising the destination SIP enabled device routing the SIP INVITE message based upon the identifier of the client device.

8. The method of claim 1, wherein the client device comprises a Voice over Internet Protocol endpoint device.

9. A method comprising:
receiving a Session Initiation Protocol (SIP) message at a SIP enabled device;
extracting an identifier of a source client device from the SIP message, wherein the identifier is extracted from a client certificate that is used to authenticate a SIP communication session between the source client device and the SIP enabled device;
determining from the identifier of the source client device a policy that applies to SIP communication sessions established by the source client device; and
sending a SIP message to a destination device to establish the SIP communication session between the source client device and the destination device that conforms with the policy.

10. The method of claim 9, wherein extracting the identifier of the source client device comprises extracting an identifier derived from a Subject Alternative Name (SAN) list of the client certificate associated with the source client device.

11. The method of claim 10, wherein the receiving the SIP message comprises receiving the SIP message from a device that performed a Transport Layer Security (TLS) handshake with the source client device; and
wherein extracting the identifier of the source client device comprises extracting an identifier derived from the client certificate provided by the source client device during the TLS handshake.

12. The method of claim 9, wherein determining from the identifier of the source client device the policy that applies to the source client device comprises determining a call feature to be enabled on the SIP communication session between the source client device and the destination device.

13. The method of claim 9, wherein determining from the identifier of the source client device the policy that applies to the source client device comprises determining bandwidth entitlements for the SIP communication session between the source client device and the destination device.

14. The method of claim 9, wherein determining from the identifier of the source client device the policy that applies to the source client device comprises determining a routing path for the SIP communication session between the source client device and the destination device.

15. An apparatus comprising:
a network interface of a Session Initiation Protocol (SIP) enabled network connected device, wherein the network interface is configured to communicate over a network;
a memory, and
one or more processors, wherein the one or more processors are configured to:
receive, via the network interface of the SIP enabled network connected device, a client certificate from a client device, wherein the client certificate is used to authenticate a communication session between the client device and the SIP enabled network connected device;
validate the client certificate with information received from a certificate authority;
determine an identifier of the client device from the client certificate;
store the identifier of the client device in the memory;
receive, via the network interface, a SIP message from the client device;
insert the identifier of the client device into the SIP message; and
transmit, via the network interface, the SIP message to a destination SIP enabled device after inserting the identifier of the client device into the SIP message.

16. The apparatus of claim 15, wherein the one or more processors are further configured to transmit the SIP message to the destination SIP enabled device by transmitting the SIP message to a cloud service routing engine.

17. The apparatus of claim 15, wherein the apparatus comprises a cloud service edge device.

18. The apparatus of claim 15, wherein the one or more processors are further configured to store the identifier of the client device in the memory by storing an identifier from a Subject Alternative Name (SAN) list of the client certificate.

19. The apparatus of claim 15, wherein the one or more processors are further configured to:
receive the client certificate by receiving the client certificate as part of a Transport Layer Security (TLS) handshake to establish the communication session with the client device, wherein the communication session comprises a TLS session; and receive the SIP message by receiving the SIP message through the TLS session.

20. The apparatus of claim 15, wherein the one or more processors are further configured to receive the SIP message by receiving a SIP INVITE message.

* * * * *